US009668177B2

(12) United States Patent
Grob-Lipski et al.

(10) Patent No.: US 9,668,177 B2
(45) Date of Patent: May 30, 2017

(54) HANDOVER METHOD AND APPARATUS IN A WIRELESS COMMUNICATIONS NETWORK

(75) Inventors: Heidrun Grob-Lipski, Starzach (DE); Stephen Kaminski, Eislingen (DE); Hajo-Erich Bakker, Eberdingen (DE); Dietrich Zeller, Sindelfingen (DE)

(73) Assignee: Alcaltel Lucent, Boulogne-Billancourt (FR)

( * ) Notice: Subject to any disclaimer, the term of this patent is extended or adjusted under 35 U.S.C. 154(b) by 750 days.

(21) Appl. No.: 13/058,585

(22) PCT Filed: Aug. 11, 2009

(86) PCT No.: PCT/EP2009/005820
§ 371 (c)(1),
(2), (4) Date: May 6, 2011

(87) PCT Pub. No.: WO2010/017961
PCT Pub. Date: Feb. 18, 2010

(65) Prior Publication Data
US 2011/0207452 A1    Aug. 25, 2011

(30) Foreign Application Priority Data
Aug. 11, 2008    (EP) ..................... 08290766

(51) Int. Cl.
*H04W 4/00*    (2009.01)
*H04W 36/00*    (2009.01)
(Continued)

(52) U.S. Cl.
CPC ........ *H04W 36/0033* (2013.01); *H04W 28/18* (2013.01); *H04W 76/028* (2013.01); *H04W 92/20* (2013.01)

(58) Field of Classification Search
CPC ............... H04W 4/00; H04W 36/0083; H04W 36/0055; H04W 24/02
(Continued)

(56) References Cited

U.S. PATENT DOCUMENTS

2005/0288023 A1* 12/2005 Kim .................. H04W 36/0005
455/439
2006/0046724 A1* 3/2006 Ton et al. ..................... 455/442
(Continued)

FOREIGN PATENT DOCUMENTS

CN         101124840 A    2/2008
EP         1 933 578 A    6/2008
(Continued)

OTHER PUBLICATIONS

Nortel: "Handover Failure and Data Forwarding Stop," 3$^{rd}$ Generation Partnership Project (3GPP), vol. RAN WG3, No. Athens, Greece, XP050162233, Aug. 15, 2007.
(Continued)

*Primary Examiner* — Michael Faragalla
(74) *Attorney, Agent, or Firm* — Fay Sharpe, LLP

(57) ABSTRACT

A method for handover in a wireless communications network includes the step of communicating information between a target network node and a source network node to enable the source network node to identify and to distinguish types of failures prior to, during or after handover. The information may relate to: "Handover command not received" due to RLF prior to handover or Handover command failure experienced in the source cell; or "Handover failure" where "Handover command received" is followed by Access failure in the target cell. The method is applicable, for example, to networks in accordance with LTE.

20 Claims, 4 Drawing Sheets

Handover Command Failure during LTE Handover

(51) Int. Cl.
  *H04W 28/18* (2009.01)
  *H04W 92/20* (2009.01)
  *H04W 76/02* (2009.01)

(58) Field of Classification Search
  USPC .................................. 455/436–444; 370/331
  See application file for complete search history.

(56) References Cited

U.S. PATENT DOCUMENTS

2009/0149180 A1* 6/2009 Kitazoe .................... 455/436
2011/0075633 A1* 3/2011 Johansson et al. ......... 370/331

FOREIGN PATENT DOCUMENTS

JP    2008503172 A    1/2008
WO   WO 2005/120183 A   12/2005

OTHER PUBLICATIONS

Alcatel-Lucent: "Specification of New Handover Causes in LTE," 3$^{rd}$ Generation Partnership Project (3GPP), vol. RAN WG3, No. Kansas City, USA, XP050164300, Apr. 30, 2008.

Alcatel-Lucent: "Introduction of New S1 Handover Cause Values," 3$^{rd}$ Generation Partnership Project (3GPP), vol. RAN WG3, No. Kansas City, USA, XP050164302, Apr. 30, 2008.

Huawei: "Specification Cause Value for X2 Handover Preparation Failure," 3$^{rd}$ Generation Partnership Project (3GPP), vol. RAN WG3, No. Kansas City, USA, XP050164353, Apr. 30, 2008.

Nokia Siemens Networks et al.: "Radio Link Failure Recovery," 3$^{rd}$ Generation Partnership Project (3GPP), vol. R2-072382, pp. 1-8, 29, Jun. 2007.

International Search Report for PCT/EP2009/005820 dated Dec. 14, 2009.

English Bibliography for Japanese Patent Application Publication No. JP2008503172A, published Jan. 31, 2008, printed from Thomson Innovation on Apr. 21, 2016, 6 pp.

R2-083183, RRC Connection Reconfiguration Failure, 3GPP TSG-RAN WG2 bis, Jun. 30-Jul. 4 2008, Warsaw, Poland, 10 pp.

English Bibliography for Chinese Patent Application Publication No. CN101124840A, published Feb. 13, 2008, printed from Thomson Innovation on Feb. 2, 2017, 4 pp.

* cited by examiner

LTE Handover event creation in the UE

RLF prior to Handover

Handover Command Failure during LTE Handover

Access Failure during LTE Handover

HANDOVER METHOD AND APPARATUS IN A WIRELESS COMMUNICATIONS NETWORK

FIELD OF THE INVENTION

The present invention relates to a method and apparatus for handover in a wireless communications network, and more particularly, but not exclusively, to a method and apparatus implemented in accordance with the 3rd Generation Partnership Project (3GPP) evolved Universal Terrestrial Radio Access Network (E-UTRAN) and evolved Universal Terrestrial Radio Access (E-UTRA) specification

BACKGROUND

Currently, 3GPP is considering development of E-UTRA and E-UTRAN as set out in the technical specification 3GPP TS 36.300 v 8.4.0 (March 2008), incorporated herein by way of reference, and related documents. 3GPP Long Term Evolution (LTE) aims to enhance the Universal Mobile Telecommunications System (UMTS) standard, for example, by improving efficiency and services.

In E-UTRAN, user equipment (UE) communicates with a network node, NodeB (eNB), with data being sent on radio bearers (RBs) over a radio link between them. The eNB interfaces with a Mobile Management Entity (MME) via an interface designated as S1. The E-UTRAN network includes a plurality of eNBs and MMEs and the UE may be handed over from one eNB to another to achieve optimum performance, for example under fading channel conditions or where the UE is moving from one cell coverage area to another. Neighboring eNBs may communicate with one another over the X2 interface between them.

The connection between the UE and the source eNB to which it is attached may be lost, this being known as radio link failure (RLF). It had previously been proposed that a UE experiencing an RLF and reappearing in a cell of another eNB would be handled as a transition via an idle state, RRC_IDLE. In this mechanism, when there is RLF in the source eNB, the UE enters IDLE state and selects a new target eNB. When the UE has attached to the new target eNB, and received the system information for the target eNB, the UE may perform the access procedure to establish resources in the target eNB.

RLF may be particularly likely during fading channel conditions, when handover from the source eNB to a target eNB may be imminent. To avoid going via the IDLE state, it has been suggested that a new eNB could be prepared beforehand to accept the UE by using the handover preparation procedure. The Handover_Request message can be sent to multiple eNBs which are thus able to recognize the UE, each of the eNBs being prepared as handover candidates. Then, the UE is able to carry on with its old context after having chosen the new target eNB during the mobility phase of the RLF.

In advance of LTE handover, the UE performs measurements and applies handover parameters and equations for handover event creation as specified in the 3GPP RRC protocol specification 3GPP TS 36.300 v 8.4.0 and as exemplarily shown in FIG. 1, which illustrates signal strength variation with time and the application of Handover Margin (HOM), Cell Individual Offset (OCN) and Time to Trigger Handover (TTTH) to generate creation of a handover event. Parameters other than those illustrated may be used depending on the particular network implementation.

As soon as a handover event has been generated, the UE includes this event into a MeasurementReport message and forwards it to the source eNB. The source eNB decides for or against handover. Where handover is selected, the source eNB sends a HandoverRequest message via the X2 interface to the target eNB and waits for the X2 HandoverRequest-Acknowledge message, which includes a Transparent Container, from the target eNB.

After acknowledgment, the source eNB inserts the Transparent Container into the HandoverCommand (RRCHandoverReconfiguration) message and forwards it to the UE. With this message, the UE is commanded to perform handover.

The UE synchronizes to the target eNB and sends the HandoverConfirm (RRCReconfigurationComplete) message to the target eNB to indicate successful attachment. After path switch, the target eNB delivers the UEContextRelease message via the X2 interface to the source eNB.

A successful handover procedure is one of the main key performance indicators for a mobile system. Failures during or in relation to the handover procedure are thus undesirable. In LTE, three kinds of failures might occur during or in relation to the handover procedure: Radio Link Failure (RLF) prior to handover; Handover command failure (leading to RLF); or Access failure (leading to Handover failure). Currently, Self-Organizing Network (SON) functionality is being considered for LTE. One possibility where SON functionality might be applied is in Handover Optimization in an effort to reduce failures. This may involve, for example, adapting handover parameters, such as, for example, Time to Trigger Handover (TTTH), Handover Margin (HOM), Filtering coefficient and Cell Individual Offset (OCN) for future handover event generation. Also, the Modulation and Coding Scheme (MCS) and transmission power may be adapted for subsequent HandoverCommand transmission cases. Another approach, depending on the cause of failure, might be to adjust the decision parameters for preparation of multiple eNBs.

At present, it is proposed that in any of the three failure cases mentioned above, that is, RLF prior to handover, Handover command failure and Access failure, the UE should enter a second phase of the Radio Link Failure procedure. In this mechanism, there is a UE-controlled attachment at a suitable "best available" cell, which may be a cell of the source eNB, a cell of the target eNB or a cell from another, new eNB. In the case when the UE attaches to a cell of the source eNB or the target eNB, the communication will be maintained. In the case the UE attaches to a new target eNB, the connection will break if the UE context is unknown.

BRIEF SUMMARY

According to an aspect of the invention, a method for handover in a wireless communications network includes the step of communicating information between a target network node and a source network node to enable the source network node to identify types of failures related to handover. The term "target network node" is used herein to also refer to the selected network node after handover to it has been achieved.

In an embodiment, for example, the communicated information may identify and distinguish handover failure types occurring prior to, during or after handover. For example, the communicated information may relate to "RLF" where a handover command message is not received by a mobile terminal due to RLF prior to handover or to Handover command failure experienced in the source cell; or the communicated information may relate to "Handover failure" where a Handover command message is received but followed by Access failure in the target cell. An embodiment may include communicating information about one of these failure types or two or more of the types. Reporting such information related to handover failures enables adaptation of handover parameters using the information, for example, to enhance mobility robustness and improve future handover performance. It may provide a mechanism for detecting incorrect handover parameter settings.

The invention is particularly applicable to networks and methods implemented in accordance with LTE but it may advantageously be used in networks complying with other specifications or standards. In LTE, the mobile terminal is termed a UE and the network nodes are termed eNBs. The communicated information may be included within a previously specified message for that radio access technology type and provided for another purpose. In another embodiment, a newly introduced message may carry the communicated information. For example, in one method in an LTE network, the communicated information may be included in the extension of the X2 interface message "UEContextRelease" transmitted from the target, or selected, eNB to the source eNB. In other embodiments, different existing messages may be used to carry the communicated information. In a method in an LTE network in accordance with the invention, the communicated information may be included in a newly defined message, which may be termed, for example, "UnsuccessfulReestablishment", transmitted from the selected eNB to the source eNB.

According to another aspect, a wireless network is implemented using a method in accordance with the invention.

BRIEF DESCRIPTION OF THE DRAWINGS

Some methods and embodiments of the present invention are now described by way of example only, and with reference to the accompanying drawings, in which.

DETAILED DESCRIPTION

Figure 1:
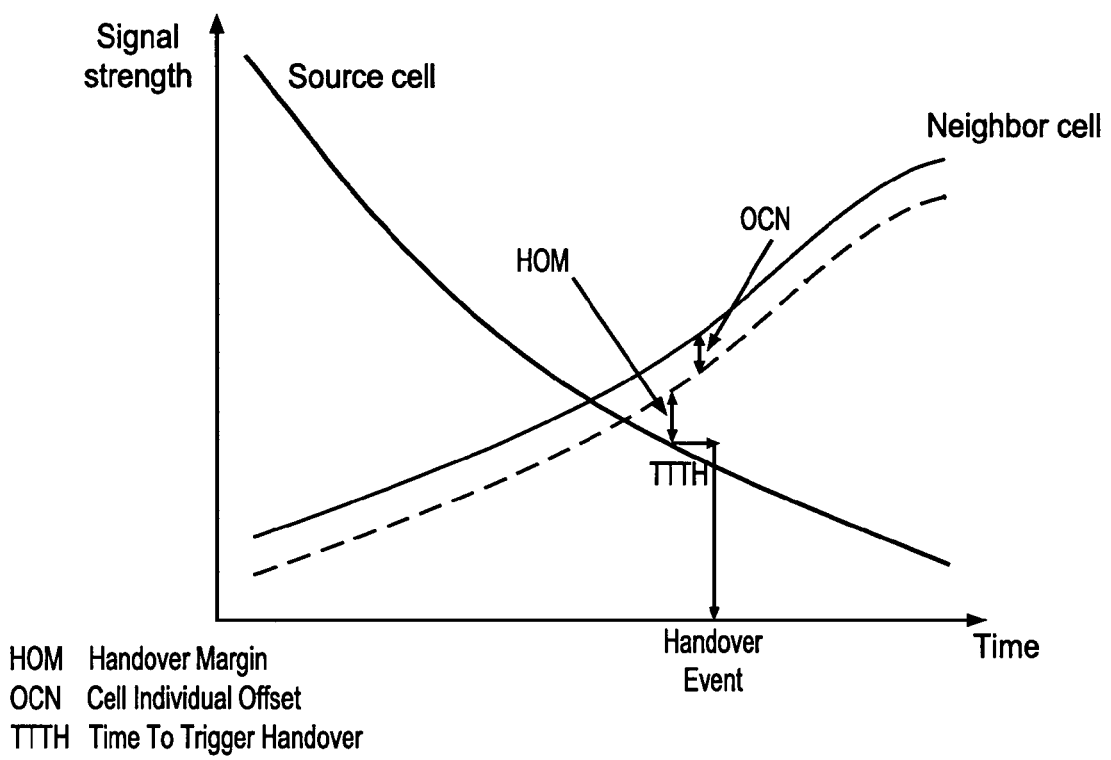
FIG. 1 schematically illustrates LTE Handover event creation in a UE.
Figure 2:
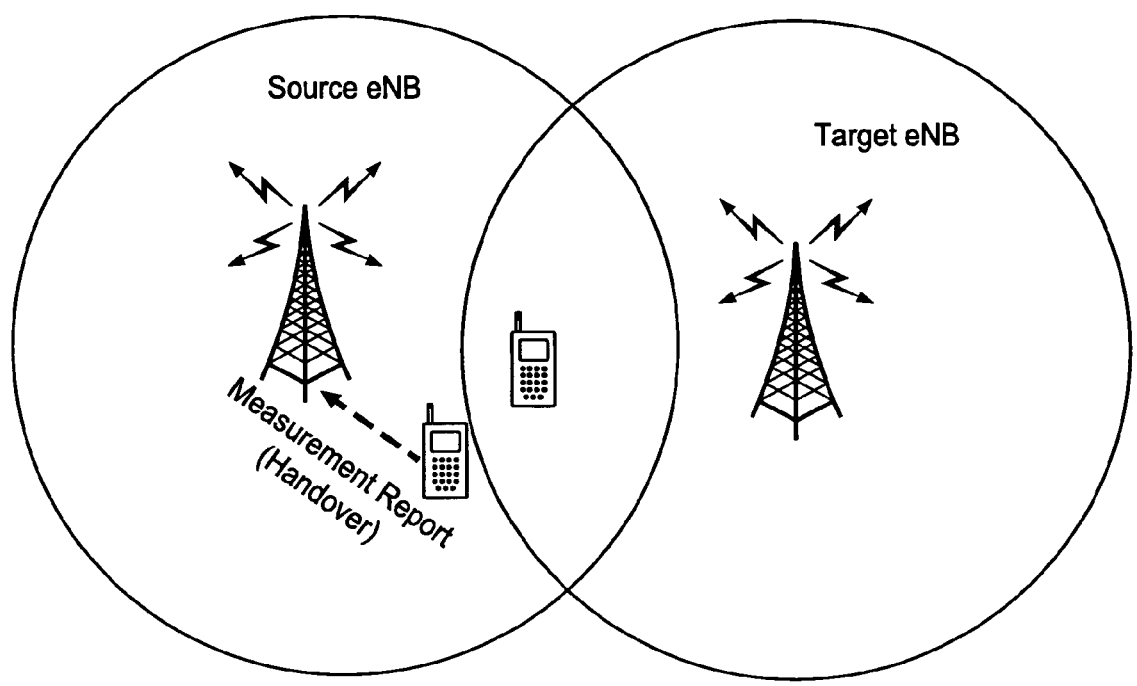
FIG. 2 schematically illustrates RLF prior to LTE handover.

As discussed above, in advance of LTE handover, a UE performs measurements for handover event creation. However, in certain circumstances, the UE may experience a sudden decrease of the received signal strength without being able to generate a MeasurementReport in time. Additionally, the UE may not able to recover in the source cell and detects Radio Link Failure (RLF) in the source cell. In another scenario, as illustrated in FIG. 2, the UE does create a MeasurementReport including a Handover event, but problems occur with the transmission of the UE MeasurementReport. If the Handover event is not received by the source eNB, handover cannot be initiated from the source eNB. This may also result in RLF in the source cell for this UE prior to LTE Handover.

Figure 3:
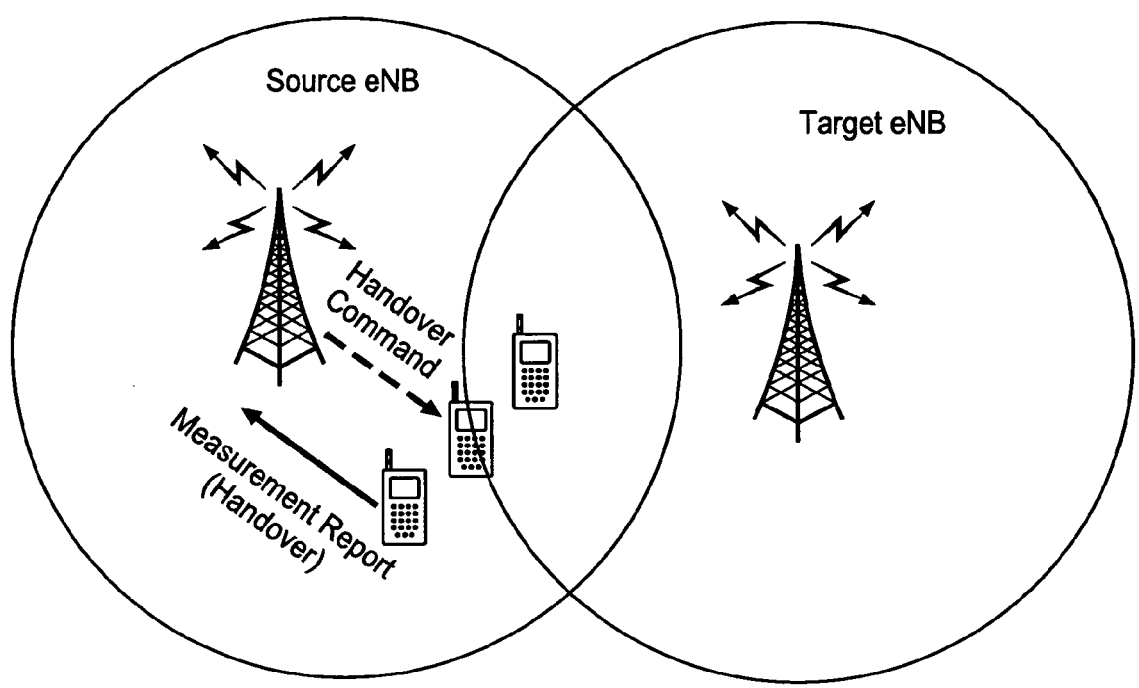
FIG. 3 schematically illustrates Handover command failure during LTE handover.

The reporting of a UE Handover event followed by HandoverCommand failure is illustrated in FIG. 3. The UE sends a measurement report which is received by the source eNB. The source eNB determines that handover is required and sends a Handover command to the UE. It is likely that the HandoverCommand message has been received by the UE under bad radio signal quality conditions. Consequently, it is possible that a considerable number of HandoverCommand messages will not be received. As the UE is not commanded to perform handover because it does not receive the HandoverCommand message(s), the UE will not access the target cell immediately. In many cases, the UE then experiences radio link problems, detects Radio Link Failure (RLF) in the source cell and HandoverCommand failure occurs.

Figure 4:
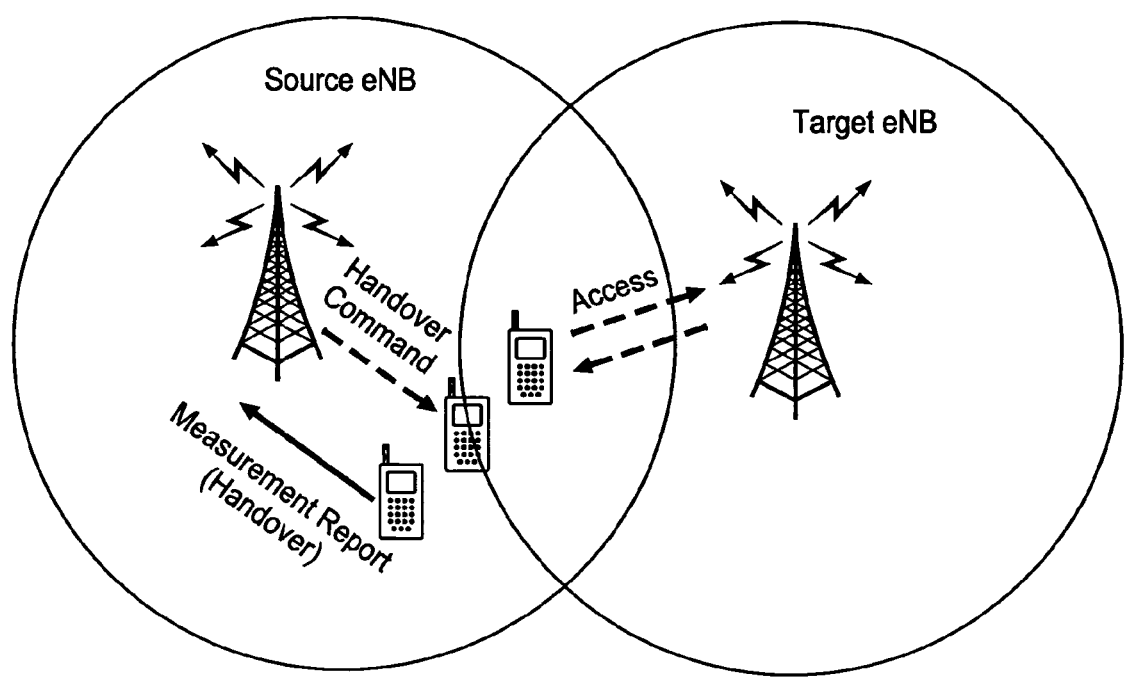
FIG. 4 schematically illustrates Access failure during LTE handover.

Access failure during LTE handover is illustrated in FIG. 4. In this scenario, there is successful reception of the HandoverCommand (RRCConnectionReconfiguration) message by the UE in the source cell and the UE starts a timer T304. Then the UE attempts to access the target cell. If the timer T304 expires without successful access to the target cell, the UE detects Handover failure due to missed access.

In each of the failure cases mentioned above, the UE stays in RRC_CONNECTED mode and selects a suitable "best available" cell. After failure has occurred, the UE performs the RRC connection re-establishment procedure, starting with the RRCConnectionReestablishmentRequest message. The RRCConnectionReestablishmentRequest message contains the ue-Identity with: c-RNTI used in the source cell; cellIdentity of the source cell; authenticationCode; and the reestablishmentCause, with four possible values, not previously defined. The authenticationCode is the MAC-I calculated over: c-RNTI used in the source cell, cellIdentity of the source cell, and "target" cell identity (assuming that the "target" cell identity indicates the cell identity of the selected cell), If the selected eNB finds a context that matches the ue-Identity, the connection can be resumed. As the UE context is only available in eNBs which have admitted the UE during an earlier executed preparation phase, RRC re-establishment succeeds only for prepared eNBs.

If the selected eNB does not find the UE context, the RRC connection is released and the UE is "pushed" to RRC_IDLE.

In order to differentiate the failure cases (i) RLF prior to handover; (ii) Handover command failure (leading to RLF); and (iii) Access failure (leading to Handover failure), the ReestablishmentCause is set in the RRCConnectionReestablishmentRequest message to (a) "RLF", which indicates that the UE did not receive a Handover command in the source cell; or (b) "Handover failure", which indicates that the UE received a Handover command in the source cell.

The selected eNB receives the RRCConnectionReestablishmentRequest containing the ue-Identity and the ReestablishmentCause. The RRC connection reestablishment succeeds if the selected eNB has been prepared during an earlier executed preparation phase. Following successful reestablishment, the ReestablishmentCause is then included in the X2 UEContextRelease message sent by the selected eNB to the source eNB. This enables the source eNB to adapt the parameters for handover event generation and its behavior for handover preparation using knowledge of the particular type of failure that has occurred.

When the source eNB receives the X2 UEContextRelease message with, for example, ReestablishmentCause value "RLF" and with the knowledge about a preceding HandoverCommand transmission to the UE, the source eNB is able to identify that RLF due to Handover command failure occurred for this UE. The source eNB may then adapt its handover parameters for future handover event generation, for example, TTTH, HOM, Filtering coefficient and OCN, or MCS selection and power for subsequent HandoverCommand transmission cases.

If the source eNB receives the X2 UEContextRelease message with ReestablishmentCause value "RLF" without preceding HandoverCommand transmission to the UE, the source eNB is able to identify that RLF prior to handover occurred in the source cell. However, recovery of the UE, unambiguous identification of the source cell and the information exchange via X2 UEContextRelease is only possible if the selected eNB has been prepared in advance.

When the source eNB receives the X2 UEContextRelease message with ReestablishmentCause value "Handover Failure", the source eNB is able to identify that Access failure occurred in the target cell for the UE. If Access failures repeatedly occur generally or for certain target cells, the source eNB may adapt, for example, the parameters for handover event generation or decision parameters for multiple preparation.

The example given above involves including the communicated information in the X2 UEContextRelease message but another type of message may be used instead in another embodiment.

The RRC connection re-establishment does not succeed if the selected eNB is unprepared and then the UE is "pushed" to RRC_IDLE. In this case, an X2 message, named, for example,. "UnsuccessfulReestablishment" is defined. This message contains the c-RNTI used in the source cell, the cellIdentity of the source cell, the cell identity of the selected cell and the ReestablishmentCause value. The target eNB identifies one or more source eNBs to which it sends this message. This identification is done by using the cellIdentity of the source cell. When the source eNB receives the X2 UnsuccessfulReestablishment message, it evaluates whether the c-RNTI actually maps to a formerly known but lost UE within the source cell which is identified by the cellIdentity. If this leads to a positive result, the message is processed as follows.

Where the X2 UnsuccessfulReestablishment message contains the ReestablishmentCause value "RLF" and if a preceding HandoverCommand transmission was performed to this UE, the source eNB is able to identify that unsuccessful reestablishment resulting from RLF due to Handover command failure did occur for this UE. If this repeatedly occurs in general, or for certain target cells, the source eNB may adapt its handover parameters for future handover event generation (such as TTTH, HOM, Filtering coefficient and OCN) or modify the transmission parameters like MCS selection and transmit power for subsequent HandoverCommand transmissions. If the X2 UnsuccessfulReestablishment message contains the ReestablishmentCause value "RLF" without preceding HandoverCommand transmission to this UE, the source eNB is able to identify that unsuccessful reestablishment resulting from RLF prior to handover did occur in the source cell.

If unsuccessful reestablishments due to RLF prior to handover repeatedly occur generally or for certain target cells, the source eNB may adapt, for example, parameters for handover event generation or decision parameters for multiple preparation.

If the X2 UnsuccessfulReestablishment message contains the ReestablishmentCause value "Handover failure", the source eNB is able to identify that Access failure did occur in the target cell. With this information, the source eNB is able to identify that problems did occur in the target cell due to Access failure for this UE. If Access failures repeatedly occur for certain target cells, the source eNB can adapt, for example, parameters for handover event generation or decision parameters for multiple preparation.

The present invention may be embodied in other specific forms, and carried out using different methods, without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for handover in a wireless communications network, comprising:
   at a selected network node, receiving a re-establishment cause from a mobile terminal during call re-establishment of the mobile terminal with the selected network node; and
   at the selected network node, sending the re-establishment cause to a source network node to enable the source network node to identify failures related to an attempted handover of the mobile terminal from the source network node to a target network node.

2. The method as claimed in claim 1 wherein different values for the re-establishment cause enable the source network node to identify and distinguish handover failure types occurring i) prior to the attempted handover, ii) during the attempted handover and prior to a successful handover command, and iii) during the attempted handover and after the handover command.

3. The method as claimed in claim 1 wherein the handover failure relates to a Radio Link Failure (RLF) prior to the attempted handover and the re-establishment cause is a value indicative of the RLF failure.

4. The method as claimed in claim 1, wherein the handover failure relates to a handover command failure in a source cell associated with the source network node and the re-establishment cause is a value indicative of the handover command failure.

5. The method as claimed in claim 1, wherein the handover failure relates to an access failure in a target cell associated with the target network node and the re-establishment cause is a value indicative of the access failure.

6. The method as claimed in claim 1 wherein the re-establishment cause is received in a request message from the mobile terminal.

7. The method as claimed in claim 1 wherein the re-establishment cause is sent in a release message to the source network node.

8. The method as claimed in claim 1 wherein the network is implemented in accordance with LTE standards.

9. The method as claimed in claim 8 wherein the re-establishment cause is included in an X2 interface message and the X2 interface message has an additional purpose.

10. The method as claimed in claim 9 wherein the re-establishment cause is included in an extension of an X2 interface UE Context Release message.

11. The method as claimed in claim 1 wherein the re-establishment cause is used to adapt handover parameters for a subsequent attempted handover.

12. A network node in a wireless communications network, comprising
    a receiver configured to receive a re-establishment cause from a mobile terminal during call re-establishment of the mobile terminal with the network node; and a transmitter configured to send the re-establishment cause to a source network node to enable the source network node to identify failures related to an attempted handover of the mobile terminal from said source network node to a target network node.

13. The network node as claimed in claim 12 wherein the handover failure relates to a Radio Link Failure (RLF) prior to the attempted handover and the re-establishment cause is a value indicative of the RLF failure.

14. The network node as claimed in claim 12 wherein different values for the re-establishment cause enable the source network node to identify and distinguish handover failure types occurring i) prior to the attempted handover, ii) during the attempted handover and prior to a successful handover command, and iii) during the attempted handover and after the handover command.

15. The network node as claimed in claim 12 wherein the handover failure relates to a handover command failure in a source cell associated with the source network node and the re-establishment cause is a value indicative of the handover command failure.

16. The network node as claimed in claim 12 wherein the handover failure relates to an access failure in a target cell associated with the target network node and the re-establishment cause is a value indicative of the access failure.

17. The network node as claimed in claim 12 wherein the re-establishment cause is received in a request message from the mobile terminal.

18. The network node as claimed in claim 12 wherein the re-establishment cause is sent in a release message to the source network node.

19. A method for performing a handover in a wireless communications network, comprising:
  receiving a request message from a mobile terminal at a selected network node during call re-establishment of the mobile terminal with the selected network node, the request message including a re-establishment cause; and
  sending a release message from the selected network node to a source network node in conjunction with the call re-establishment, the release message including the re-establishment cause to enable the source network node to identify failures related to an attempted handover of the mobile terminal from the source network node to a target network node.

20. The method as claimed in claim 19 wherein different values for the re-establishment cause enable the source network node to identify and distinguish handover failure types from i) a Radio Link Failure (RLF) associated with the source network node prior to the attempted handover, ii) a handover command failure associated with the source network node during the attempted handover, and iii) an access failure associated with the target network node during the attempted handover.

* * * * *